(12) United States Patent
Harutyunyan

(10) Patent No.: US 7,981,396 B2
(45) Date of Patent: Jul. 19, 2011

(54) METHODS FOR PRODUCTION OF CARBON NANOSTRUCTURES

(75) Inventor: Avetik Harutyunyan, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 2048 days.

(21) Appl. No.: 10/727,699

(22) Filed: Dec. 3, 2003

(65) Prior Publication Data

US 2005/0123467 A1 Jun. 9, 2005

(51) Int. Cl.
*D01C 5/00* (2006.01)
(52) U.S. Cl. ............... 423/447.3; 423/447.4; 423/447.7
(58) Field of Classification Search ............... 423/447.3, 423/447.4, 447.7
See application file for complete search history.

(56) References Cited

U.S. PATENT DOCUMENTS

| | | | |
|---|---|---|---|
| 4,615,649 A | 10/1986 | Sharpless | |
| 4,663,230 A * | 5/1987 | Tennent | 428/367 |
| 5,424,054 A | 6/1995 | Bethune et al. | |
| 5,505,566 A | 4/1996 | Gruber | |
| 5,752,788 A | 5/1998 | Crum | |
| 5,759,230 A | 6/1998 | Chow et al. | |
| 5,816,509 A | 10/1998 | Ahn et al. | |
| 6,221,330 B1 * | 4/2001 | Moy et al. | 423/447.3 |
| 6,436,167 B1 | 8/2002 | Chow et al. | |
| 2003/0161782 A1 | 8/2003 | Kim | |
| 2004/0062992 A1 | 4/2004 | Kajiura et al. | |

FOREIGN PATENT DOCUMENTS

| | | |
|---|---|---|
| JP | S53-91054 | 7/1978 |
| JP | S56-136904 | 10/1981 |
| JP | 58-180615 | 10/1983 |
| JP | S61-69906 | 5/1986 |
| JP | 2899407 | 3/1999 |
| JP | 11-246901 | 9/1999 |
| JP | H11-293308 | 10/1999 |
| JP | 2001-254109 | 9/2001 |
| JP | 2001-526164 | 12/2001 |
| JP | 2003-081617 | 3/2003 |
| WO | WO 02/070405 A | 9/2002 |
| WO | WO 02/076887 | 10/2002 |
| WO | WO 03/008331 | 1/2003 |

OTHER PUBLICATIONS

Andrews, R. et al., "Continuous Production of Aligned Carbon Nanotubes: A Step Closer to Commercial Realization", Chemical Physics Letters, Apr. 16, 1999, pp. 467-474, vol. 303, No. 5-6.
Mayne, M. et al., "Pyrolytic Production of Aligned Carbon Nanotubes From Homogenously Dispersed Benzene-Based Aerosols", Chemical Physics Letters, Apr. 20, 2001, vol. 338, pp. 101-107, Amsterdam, Netherlands.
Moisala, A. et al., "The Role of Metal Nanoparticles in The Catalytic Production of Single-Walled Carbon Nanotubes—a review", Journal of Physics: Condensed Matter, Mar. 10, 2003, pp. 3011-3035, vol. 15.
PCT International Search Report and Written Opinion; PCT/IB2004/004454, Nov. 17, 2005. 15 pages.
Songsasen, A. et al., "Preparation of Carbon Nanotubes by Nickel Catalyzed Decomposition of Liquefied Petroleum Gas (LPG)", Kasetsart University, Bangkok, Thailand, 2001, pp. 354-359, vol. 35, No. 3.
Ago, Hiroki et al., "Gas-Phase Synthesis of Single-wall Carbon Nanotubes from Colloidal Solution of Metal Nanoparticles", *J. Phys. Chem.*, Nov. 1, .2001, vol. 105, No. 43, pp. 10453-10456.
Bethune, D.S. et al., "Cobalt-Catalysed Growth of Carbon Nanotubes With Single-Atomic-Layer Walls", Nature, Jun. 17, 1993, vol. 363, pp. 605-607.
Cassell, Alan M. et al., "Large Scale CVD Synthesis of Single-Walled Carbon Nanotubes", *J. Phys. Chem.*, 1999, vol. 103, pp. 6484-6492.
Cheng, H.M. et al., "Large-Scale and Low-Cost Synthesis of Single-Walled Carbon Nanotubes by the Catalytic Pyrolysis of Hydrocarbons", *Applied Physics Letters*, vol. 72, No. 25, pp. 3282-3284.
Ci, Lijie et al., "Preparation of Carbon Nanofibers by the Floating Catalyst Method" *Carbon*, 2000, 38, pp. 1933, 1937.
Iijima, Sumio et al., "Single-Shell Carbon Nanotubes of 1-Nm Diameter", *Nature*, Jun. 17, 1993, vol. 363, pp. 603-605.
Ivanov, V. et al. "The Study of Carbon Nanotubles Produced by Catalytic Method", Elsevier Science B.V., Chemical Physics Letters, vol. 223, Jun. 24, 1994, pp. 329-335.
Journet, C. et al., "Large-Scale Production of Single-Walled Carbon Nanotubes by the Electric-Arc Technique", *Nature*, vol. 388, Aug. 21, 1997, pp. 756-758.
Li, W.Z. et al., "Large-Scale Synthesis of Aligned Carbon Nanotubes", *Science*, vol. 274, Dec. 6, 1996, pp. 1701-1703.
Nikolaev, Pavel et al., "Gas-Phase Catalytic Grown of Single-Walled Carbon Nanotubes From Carbon Monoxide", Elsevier Science B.V., *Chemical Physical Letters*, vol. 313, 1999, pp. 91-97.
Su, Ming et al., "A Scalable CVD Method for the Synthesis of Single-Walled Carbon Nanotubes With High Catalyst Productivity", Elsevier Science B.V., *Chemical Physics Letters*, vol. 322, May 26, 2000, pp. 321-326.
Thess, Andreas et al., "Crystalline Ropes of Metallic Carbon Nanotubes", *Science*, vol. 273, Jul. 26, 1996, pp. 483-487.

(Continued)

*Primary Examiner* — Edward M Johnson
(74) *Attorney, Agent, or Firm* — Fenwick & West LLP; Mark Duell

(57) ABSTRACT

Methods, processes, and apparatuses for the large scale synthesis of carbon nanostructures are provided. Metal catalysts having small diameter and narrow distribution of particle sizes are prepared and continuously injected as aerosols into a reactor. The metal catalysts are supported on supports that are substantially free of carbon, and the reactor is configured to control the flow of the gases such that the reaction time and contact of the reactants with the reactor walls can be controlled. Single-walled carbon nanotubes can be synthesized at a large scale and with high yields.

28 Claims, 4 Drawing Sheets

OTHER PUBLICATIONS

Zhu, W.H. et al., "Direct Synthesis of Long Single-Walled Carbon Nanotube Strands", *Science*, vol. 296, May 3, 2002, pp. 884-886.

Japanese Patent Office Notification of Reasons for Refusal, Japanese Patent Application No. 2006-542059, Mar. 22, 2011, eight pages.

* cited by examiner

METHODS FOR PRODUCTION OF CARBON NANOSTRUCTURES

FIELD OF INVENTION

The present invention relates to methods for the large scale preparation of carbon nanotubes and carbon nanostructures.

BACKGROUND

Carbon nanotubes are hexagonal networks of carbon atoms forming seamless tubes with each end capped with half of a fullerene molecule. They were first reported in 1991 by Sumio Iijima who produced multi-layer concentric tubes or multi-walled carbon nanotubes having up to seven walls by evaporating carbon in an arc discharge. In 1993, Iijima's group and an IBM team headed by Donald Bethune independently discovered that a single-wall nanotube could be made by vaporizing carbon together with a transition metal such as iron or cobalt in an arc generator (see Iijima et al. Nature 363:603 (1993); Bethune et al., Nature 363: 605 (1993) and U.S. Pat. No. 5,424,054). The original syntheses produced low yields of non-uniform nanotubes mixed with large amounts of soot and metal particles.

Presently, there are three main approaches for the synthesis of single- and multi-walled carbon nanotubes. These include the electric arc discharge of graphite rod (Joumet et al. Nature 388: 756 (1997)), the laser ablation of carbon (Thess et al. Science 273: 483 (1996)), and the chemical vapor deposition of hydrocarbons (Ivanov et al. Chem. Phys. Lett 223: 329 (1994); Li et al. Science 274: 1701 (1996)). Multi-walled carbon nanotubes can be produced on a commercial scale by catalytic hydrocarbon cracking while single-walled carbon nanotubes are still produced on a gram scale.

Generally, single-walled carbon nanotubes are preferred over multi-walled carbon nanotubes because they have fewer defects and are therefore stronger and more conductive than multi-walled carbon nanotubes of similar diameter. Defects are less likely to occur in single-walled carbon nanotubes because multi-walled carbon nanotubes can survive occasional defects by forming bridges between unsaturated carbon valances, while single-walled carbon nanotubes have no neighboring walls to compensate for defects. Defect-free single-walled nanotubes are expected to have remarkable mechanical, electronic and magnetic properties that could be tunable by varying the diameter, and chirality of the tube.

The electric arch discharge and the laser ablation methods of producing single-walled carbon nanotubes are not practical for producing industrial scale volumes of nanotubes. Both methods involve evaporating carbon atoms from solid carbon sources at greater than 3000° C. thereby setting a limit to the quantity of nanotubes that can be synthesized. Moreover, both methods grow nanotubes in highly tangled form with carbon and metal impurities. The nanotubes produced by these methods are difficult to purify, manipulate and assemble for building nanotube devices. The chemical vapor deposition method, on the other hand, is scalable and represents possibly the best method for the large scale production of nanotubes.

Presently, there are two types of chemical vapor deposition for the large scale syntheses of single-walled carbon nanotubes that are distinguishable depending on the form of supplied catalyst. In one, the catalyst is embedded in porous material or supported on a substrate, placed at a fixed position of a furnace, and heated in a flow of hydrocarbon precursor gas. Cassell et al. (1999) J. Phys. Chem. B 103: 6484-6492 studied the effect of different catalysts and supports on the synthesis of bulk quantities of single-walled carbon nanotubes using methane as the carbon source in chemical vapor deposition. They systematically studied $Fe(NO_3)_3$ supported on $Al_2O_3$, $Fe(SO_4)_3$ supported on $Al_2O_3$, Fe/Ru supported on $Al_2O_3$, Fe/Mo supported on $Al_2O_3$, and Fe/Mo supported on $Al_2O_3$—$SiO_2$ hybrid support. The bimetallic catalyst supported on the hybrid support material provided the highest yield of the nanotubes. Su et al. (2000) Chem. Phys. Lett. 322:321-326 reported the use of a bimetal catalyst supported on an aluminum oxide aerogel to produce single-walled carbon nanotubes. They reported preparation of the nanotubes is greater than 200% the weight of the catalyst used. In comparison, similar catalyst supported on $Al_2O_3$ powder yields approximately 40% the weight of the starting catalyst. Thus, the use of the aerogel support improved the amount of nanotubes produced per unit weight of the catalyst by a factor of 5.

In the second type of carbon vapor deposition, the catalyst and the hydrocarbon precursor gas are fed into a furnace using the gas phase, followed by the catalytic reaction in a gas phase. The catalyst is usually in the form of a metalorganic. Nikolaev et al. (1999) Chem. Phys. Lett. 313:91 disclose a high-pressure CO reaction (HiPCO) method in which carbon monoxide (CO) gas reacts with the metalorganic iron pentacarbonyl ($Fe(CO)_5$) to form single-walled carbon nanotubes. It is claimed that 400 g of nanotubes can be synthesized per day. Chen et al. (1998) Appl. Phys. Lett. 72: 3282 employ benzene and the metalorganic ferrocene ($Fe(C_5H_5)_2$) delivered using a hydrogen gas to synthesize single-walled carbon nanotubes. The disadvantage of this approach is that it is difficult to control particles sizes of the metal catalyst. The decomposition of the organometallic provides the metal catalyst having variable particle size that results in nanotubes having a wide distribution of diameters. Further, the decomposition of the metalorganic precursor forms carbon structures that are not desired. This is presumably because the temperature at the inlet of the reactor is very low in comparison with the decomposition temperature of the catalyst material, and the heat conductivity of the gas is very low. Therefore, the catalyst is gradually heated and slowly decomposed, with the possibility that they are completely covered with carbon layers before they form catalyst particles suitable for nanotube growth.

In another method, the catalyst is introduced as a liquid pulse into the reactor. Ci et al. (2000) Carbon 38:1933-1937 dissolve ferrocene in 100 mL of benzene along with a small amount of thiophene. The solution is injected into a vertical reactor in a hydrogen atmosphere. The technique requires that the temperature of bottom wall of the reactor had to be kept at between 205-230° C. to obtain straight carbon nanotubes. In the method of Ago et al. (2001) J. Phys. Chem. 105: 10453-10456, colloidal solution of cobalt:molybdenum (1:1) nanoparticles is prepared and injected into a vertically arranged furnace, along with 1% thiophene and toluene as the carbon source. Bundles of single-walled carbon nanotubes are synthesized.

The synthesis of long strands of ordered single-walled carbon nanotubes by catalytic chemical vapor deposition has been reported by Zhu et al. (2002) Science 296:884-886. They utilize the floating ferrocene catalyst in a vertical furnace to catalytically pyrolyze n-hexane, where n-hexane is combined with thiophene and hydrogen. Typically, thiophene and ferrocene are dissolved in n-hexane and sprayed into the hydrogen stream from the top of a vertical furnace heated to the pyrolysis temperature of 1423K. The gas flow carries the nanotube strands downstream, and the nanotubes can be collected at the bottom of the furnace at the reported yields of about 0.5 g/hour.

The two-step method of preparing a colloidal solution and injecting it into the reactor has the disadvantages of forming non-desired carbon structures due to the decomposition of the organic surfactants and a low yield of the single-walled carbon nanotubes. Thus, the presently available methods of synthesizing carbon nanotubes produce bulk amounts of carbon nanotubes that are generally tangled and kinked. Further, the nanotubes can have molecular level structural defects that can adversely impact their properties.

Thus, there is a need for methods for bulk, industrial scale synthesis of carbon nanotubes. Preferably, the method allows for the growth of carbon nanotubes of a desired type, such as single-wall nanotubes, and with little or no impurities.

SUMMARY

The present invention provides methods, apparatuses, and processes for the large scale continuous production of carbon nanostructures, such as single-walled carbon nanotubes. In one aspect, metal particles having controlled particle size and/or diameter are supported on non-carbon containing powdered oxide supports. The resulting metal nanoparticles are used as a growth catalyst for the growth of carbon nanotubes. The supported metal nanoparticles are entrained in a gas and delivered into the reaction chamber as an aerosol. Additionally, carbon precursor gas, such as methane, is provided in the reaction chamber. The flow of the reactants and products through the reaction chamber is controlled such that their contact with the reaction vessel walls is minimized. The reactants are heated to a temperature below about 1000° C., and the product is separated.

In one aspect, the invention provides methods for synthesizing carbon nanostructures, the method comprising providing a catalyst of metal nanoparticles; entraining the catalyst in an inert gas; and exposing the entrained catalyst to a carbon precursor gas at a temperature sufficient to form carbon nanostructures. The catalyst can be a metal selected from the group consisting of iron, nickel, molybdenum and cobalt, or mixtures thereof, and can have a particle size less than about 2 mm, preferably between 3 nm to 7 nm or about 5 nm to 10 nm. The catalyst can be supported on powdered oxide substrate selected from the group consisting of $Al_2O_3$, $SiO_2$, MgO and zeolites. The inert gas can be selected from the group consisting of argon, helium, or hydrogen, and the carbon precursor gas can be selected from the group consisting of methane, ethane, propane, ethylene, propylene, and carbon dioxide. The reactants can be heated in a reaction vessel heated to a temperature of about 800° C. to 1000° C. The carbon nanotubes can be collected and purified.

In another aspect, the invention provides systems for continuous, large scale production of carbon nanotubes. The system for continuous production of carbon nanostructures comprises a particle injector for entraining a catalyst in an inert gas flow; a pre-heater for heating the gas flow of entrained catalyst; and a reaction chamber wherein the reaction chamber comprises an inlet for the gas flow of entrained catalyst, an inlet for flow of reactant gases, and inlet for creating a helical flow of gases within the reaction chamber. The catalyst can be a metal selected from the group consisting of iron, nickel, molybdenum and cobalt, or mixtures thereof, and can have a particle size less than about 2 nm, preferably between 3 nm to 7 nm or about 5 nm to 10 nm. The catalyst can be supported on powdered oxide substrate selected from the group consisting of $Al_2O_3$, $SiO_2$, MgO and zeolites. The inert gas can be selected from the group consisting of argon, helium, nitrogen, or hydrogen, and the carbon precursor gas can be selected from the group consisting of methane, ethane, propane, ethylene, propylene, and carbon dioxide.

In yet another aspect, the invention provides processes for the continuous, large scale production of carbon nanotubes. The invention thus provides carbon nanotube structure produced by the process of entraining a catalyst in an inert gas, wherein the catalyst is a metal supported on a powdered oxide substrate, wherein the metal is selected from the group consisting of iron, nickel, molybdenum and cobalt, or mixtures thereof, and the powdered oxide substrate selected from the group consisting of $Al_2O_3$, $SiO_2$, MgO and zeolites; exposing the entrained catalyst to a precursor gas at a temperature sufficient to form carbon nanotube structure; and collecting the synthesized carbon nanostructures. The inert gas can be selected from the group consisting of argon, helium, or hydrogen, and the carbon precursor gas can be selected from the group consisting of methane, ethane, propane, ethylene, propylene, and carbon dioxide.

These and other aspects of the present invention will become evident upon reference to the following detailed description. In addition, various references are set forth herein which describe in more detail certain procedures or compositions, and are therefore incorporated by reference in their entirety.

DETAILED DESCRIPTION

I. Definitions

Figure 1:
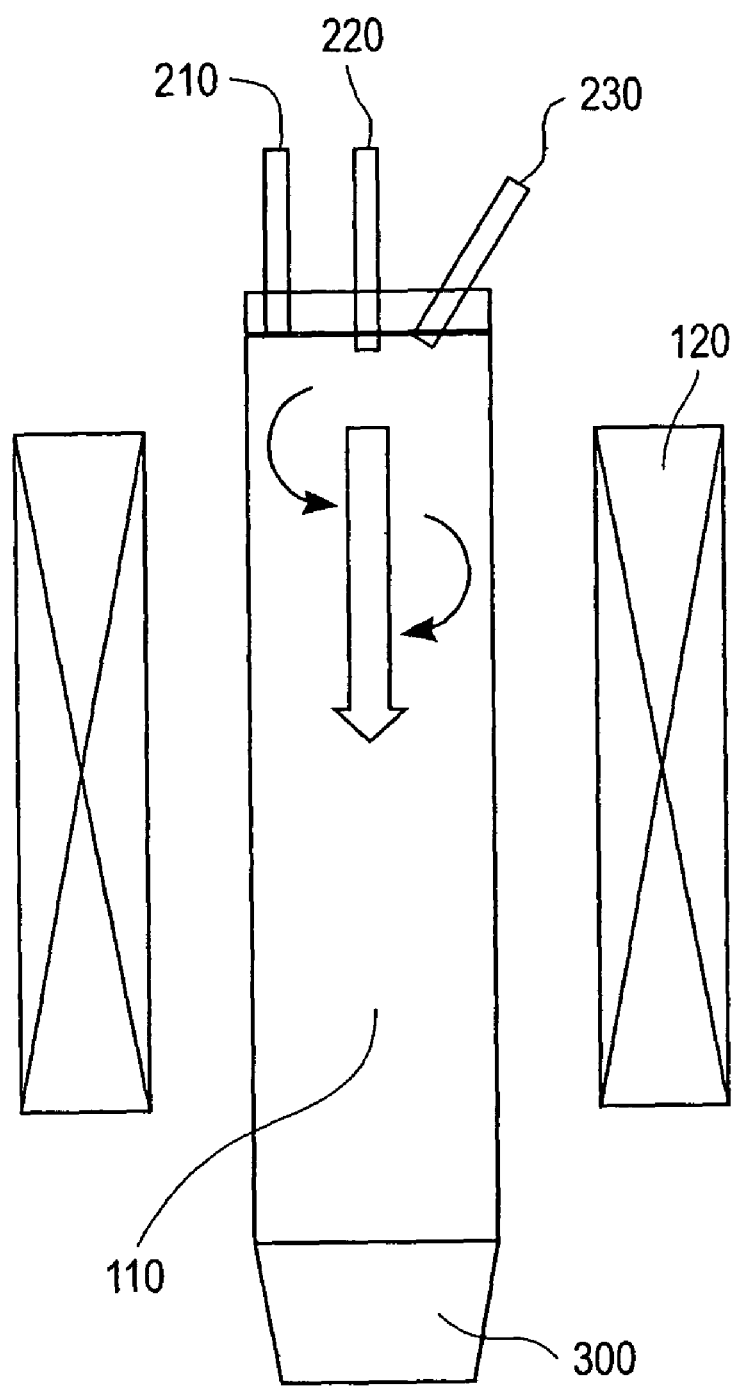
FIG. 1 illustrates a reaction chamber for the large scale production of one-dimensional carbon nanostructures of the present invention.

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry $3^{rd}$ Ed." Vols. A and B, Plenum Press, New York, and Cotton et al. (1999) "Advanced Inorganic Chemistry $6^{th}$ Ed." Wiley, N.Y.

The terms "single-walled carbon nanotube" or "one-dimensional carbon nanotube" are used interchangeable and refer to cylindrically shaped thin sheet of carbon atoms having a wall consisting essentially of a single layer of carbon atoms, and arranged in an hexagonal crystalline structure with a graphitic type of bonding.

The term "multi-walled carbon nanotube" as used herein refers to a nanotube composed of more than one concentric tubes.

The terms "metalorganic" or "organometallic" are used interchangeably and refer to co-ordination compounds of organic compounds and a metal, a transition metal or metal halide.

The term "passivating solvent" as used herein refers to an organic solvent that will not co-ordinate with the metal ions, and that is suitable for use in thermal decomposition reactions.

The term "halogen" as used herein refers to fluoro, bromo, chloro and/or iodo.

The term "lower alkoxy" refers to the oxides of lower alkyl groups. Examples of lower alkyl groups include, but are not limited to, methyl, ethyl, propyl, isopropyl, butyl, isobutyl, sec-butyl, tert-butyl, pentyl, n-hexyl, octyl, dodecyl, and the like. The oxides includes methoxide, ethoxide, butoxide, and the like.

II. Overview

The present invention discloses methods, apparatus, and processes for the large-scale manufacture of carbon nanotubes and structures composed of carbon nanotubes, preferably single-wall nanotubes.

The methods, apparatuses, and processes of the present invention are for synthesizing carbon nanotubes, preferably single-walled carbon nanotubes on a large scale. Catalyst particles of controlled particle size and surface area are isolated and injected into a reactor in the form of an aerosol. A carbon precursor gas is concomitantly introduced into the reactor. The flow of the gases within the reactor chamber is controlled such that minimum amount of carbon deposition occurs on the interior walls of the reaction chamber. The carbon nanotubes thus produced are collected and purified.

The methods, apparatuses, and processes disclosed herein are advantageous in that the particle size, diameter distribution, and surface area of the catalyst particle can be controlled, thereby providing control over the size, shape, type, and properties of the carbon nanotubes formed during the chemical deposition process. In addition, the metal particles that act as catalysts are supported on well characterized porous powders, such as $Al_2O_3$, instead of supports containing organic materials. Therefore, undesired carbon materials and other impurities are not produced. The invention thus provides for multi-gram synthesis of carbon nanotubes that are substantially free of contaminants.

III. The Reaction Vessel

In one aspect of the invention, a system for producing carbon nanotubes is provided. The system comprises a reactor capable of maintaining the reaction temperature and having an air-tight chamber where a source of metal catalyst particles as an aerosol, a source of carbon precursor gas and a source of inert gases is provided. The system can additionally comprise an evacuating system connected to the reactor for evacuating gases from the chamber, and/or a collection system for collecting, filtering, and enriching the nanotubes. The system, process and methods of the present invention are described with reference to the accompanying figures, where like reference numerals indicate identical or functionally similar elements. Also in the figures, the left most digit of each reference numeral corresponds to the figure in which the reference numeral is first used.

The reaction vessel can be any conventional furnace configured to allow for control over gas flows within a heated reaction chamber. For example, the reaction vessel can be the horizontal reaction vessel, such as the Carbolite model TZF 12/65/550, or it can be a vertical reaction vessel. The reaction vessel is preferably a vertical reaction vessel 100 illustrated in FIG. 1. The reaction chamber 110 can be a quartz tube placed inside the furnace having a means of heating 120 the reaction chamber to the desired temperature required for the growth of the carbon nanotubes. The reaction chamber may be maintained at the appropriate temperature by 1) preheating the carbon precursor gases, 2) preheating the inert gases, 3) preheating the metal catalyst particles on powder supports, 4) externally heating the reaction chamber, 5) applying localized heating in the reaction chamber, such as by laser, induction coil, plasma coil, or any combination of the foregoing. Gas inlets 210, 220, and 230 provide flows of the inert and regent gases and the catalyst during operation of the furnace. Downstream recovery of the product produced by this process can be effected by known means such as filtration, centrifugation and the like. For example, the product is collected at the bottom of the furnace and separated using a separator 300. A plurality of separators can be attached to the apparatus if desired.

In one aspect, the metal nanoparticles, in the form of an aerosol, are introduced into the reaction chamber 110 via inlet 210. The methods and apparatuses for forming the aerosol are described in detail in the commonly owned and co-pending application entitled "Dry Powder Injector." The carbon precursor gas, optionally as a mixture with one or more other gases, is introduced into the reaction chamber via inlet 220. Inlets 210 and 220 are positioned such that the flow of the catalyst and the carbon precursor gas is substantially aligned with the long axis of the reaction chamber. In contrast, the inlet 230, which provides the means for the introduction of another gas, such as argon, into the reaction chamber, and the inlet is positioned at an angle relative to the long axis of the reaction chamber. The angle of the gas inlet 230 will vary depending on the gas chosen, rate of flow of the gas, the geometry of the reaction chamber, the temperature of the reaction chamber, and the like. The angle between the long axis of the reaction chamber and inlet 230 can be 45° to about 90°, or any angle in between. The angle is preferably about 70° to about 85°, or more preferably about 70° to about 80°. The angle between the inlet 230 and the long axis is chosen such that the gas introduced through the inlet follows a helical path along the interior walls of the reaction chamber as it flows through it. Further, two or more "helical" inlets can be provided. The helical path of the gas results in the reduction of deposition of carbon material on the interior walls of the reaction chamber that normally occurs under chemical vapor deposition conditions. The gas inlet 230 can thus be adjusted to the angle that results in the reduction of carbon deposition. When gas inlet 230 is not properly aligned, the reaction chamber will quickly accumulate a black layer of soot on the interior walls. Thus, in the reaction chamber composed of a transparent material, such as glass, proper alignment can be verified visually.

The components for the delivery system of gas flow can be connected together using standard ½ inch stainless steel tubing. Conventional gas sources, such as pressurized canisters with pressure regulators, can be used for gas sources. The amount of gas delivered to the inlets can typically be controlled using standard mass flow controllers that are commercially available.

Downstream recovery of the product produced by this process can be effected by known means such as filtration, centrifugation and the like.

V. The Catalyst

The method, processes, and apparatuses of the present invention use metal nanoparticles as the metallic catalyst. The metal or combination of metals selected as the catalyst can be processed to obtain the desired particle size and diameter distribution. The metal nanoparticles can then be separated by being supported on a material suitable for use as a support during synthesis of carbon nanotubes using the metal growth catalysts described below. Such materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. The metal nanoparticles on the support powders are injected as an aerosol into the reaction vessel. The function of the metallic catalyst in the carbon nanotube growth process is to decompose the carbon precursors and aid the deposition of ordered carbon as nanotubes The metal catalyst can be selected from a Group V metal, such as V or Nb, and mixtures thereof, a Group VI metal including Cr, W, or Mo, and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Sc, Y, or La and mixtures thereof. Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Pt—Cr, Pt—W, and Pt—Mo. Preferably, the metal catalyst is iron, cobalt, nickel, molybdeum, or a mixture thereof, such as Fe—Mo, Co—Mo and Ni—Fe—Mo.

The metal, bimetal, or combination of metals are used to prepare metal nanoparticles having defined particle size and diameter distribution. The metal nanoparticles can be prepared by thermal decomposition of the corresponding metal salt added to a passivating salt, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. Metal nanoparticles having particle size of about 0.1 nm to about 100 nm, preferably about 0.01 nm to about 20 nm, more preferably about 0.1 nm to about 3 nm and most preferably about 0.3 nm to 3 nm can be prepared. The metal nanoparticles can thus have a particle size of 0.1, 1, 2, 3, 4, 5, 6, 7, 8, 9, or 10 nm, and up to about 20 nm. In another aspect, the metal nanoparticles can have a range of particle sizes. For example, the metal nanoparticles can have particle sizes in the range of about 3 nm and about 7 nm in size, about 5 nm and about 10 nm in size, or about 8 nm and about 16 nm in size. The metal nanoparticles can optionally have a diameter distribution of about 0.5 nm to about 20 nm, preferably about 1 nm to about 15 nm, more preferably about 1 nm to about 5 nm. Thus, the metal nanoparticles can have a diameter distribution of about 1, 2, 3, 4, 5, 6, 7, 8, 9, 10, 11, 12, 13, 14, or 15 nm.

The metal salt can be any salt of the metal, and can be selected such that the melting point of the metal salt is lower than the boiling point of the passivating solvent. Thus, the metal salt contains the metal ion and a counter ion, where the counter ion can be nitrate, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof. The melting point of the metal salt is preferably about 5° C. to 50° C. lower than the boiling point, more preferably about 5° C. to about 20° C. lower than the boiling point of the passivating solvent.

The metal salt can be dissolved in a passivating solvent to give a solution, a suspension, or a dispersion. The solvent is preferably an organic solvent, and can be one in which the chosen metal salt is relatively soluble and stable, and where the solvent has a high enough vapor pressure that it can be easily evaporated under experimental conditions. The solvent can be an ether, such as a glycol ether, 2-(2-butoxyethoxy)ethanol, $H(OCH_2CH_2)_2O(CH_2)_3CH_3$, which will be referred to below using the common name dietheylene glycol mono-n-butyl ether, and the like.

The relative amounts of metal salt and passivating solvent are factors in controlling the size of nanoparticles produced. A wide range of molar ratios, here referring to total moles of metal salt per mole of passivating solvent, can be used for forming the metal nanoparticles. Typical molar ratios of metal salt to passivating solvent include ratios as low as about 0.0222 (1:45), or as high as about 2.0 (2:1), or any ratio in between. Thus, for example, about $5.75 \times 10^{-5}$ to about $1.73 \times 10^{-3}$ moles (10-300 mg) of $FeAc_2$ can be dissolved in about $3 \times 10^{-4}$ to about $3 \times 10^{-3}$ moles (50-500 ml) of diethylene glycol mono-n-butyl ether.

In another aspect, more than one metal salt can be added to the reaction vessel in order to form metal nanoparticles composed of two or more metals, where the counter ion can be the same or can be different. The relative amounts of each metal salt used can be a factor in controlling the composition of the resulting metal nanoparticles. For the bimetals, the molar ratio of the first metal salt to the second metal salt can be about 1:10 to about 10:1, preferably about 2:1 to about 1:2, or more preferably about 1.5:1 to about 1:1.5, or any ratio in between. Thus, for example, the molar ratio of iron acetate to nickel acetate can be 1:2, 1:1.5, 1.5:1, or 1:1. Those skilled in the art will recognize that other combinations of metal salts and other molar ratios of a first metal salt relative to a second metal salt may be used in order to synthesize metal nanoparticles with various compositions.

The passivating solvent and the metal salt reaction solution can be mixed to give a homogeneous solution, suspension, or dispersion. The reaction solution can be mixed using standard laboratory stirrers, mixtures, sonicators, and the like, optionally with heating. The homogenous mixture thus obtained can be subjected to thermal decomposition in order to form the metal nanoparticles.

The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner, and the heating can be under reflux. The length of the thermal decomposition can be selected such that the desired size of the metal nanoparticles can be obtained. Typical reaction times can be from about 10 minutes to about 120 minutes, or any integer in between. The thermal decomposition reaction is stopped at the desired time by reducing the temperature of the contents of the reaction vessel to a temperature below the melting point of the metal salt.

The size and distribution of metal nanoparticles produced can be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

The metal nanoparticles, such as those formed by thermal decomposition described in detail above, can then be supported on solid supports. The solid support can be silica, alumina, MCM-41, MgO, $ZrO_2$, aluminum-stabilized magnesium oxide, zeolites, or other oxidic supports known in the art, and combinations thereof. For example, $Al_2O_3$—$SiO_2$ hybrid support could be used. Preferably, the support is aluminum oxide ($Al_2O_3$) or silica ($SiO_2$). The oxide used as solid support can be powdered thereby providing small particle sizes and large surface areas. The powdered oxide can preferably have a particle size between about 0.01 µm to about 100 µm, more preferably about 0.1 µm to about 10 µm, even more preferably about 0.5 µm to about 5 µm, and most preferably about 1 µm to about 2 µm. The powdered oxide can have a surface area of about 50 to about 1000 $m^2/g$, more preferably a surface area of about 200 to about 800 $m^2/g$. The powdered oxide can be freshly prepared or commercially available.

In one aspect, the metal nanoparticles are supported on solid supports via secondary dispersion and extraction. Secondary dispersion begins by introducing particles of a powdered oxide, such as aluminum oxide ($Al_2O_3$) or silica ($SiO_2$), into the reaction vessel after the thermal decomposition reaction. A suitable $Al_2O_3$ powder with 1-2 µm particle size and having a surface area of 300-500 $m^2/g$ is commercially available from Alfa Aesar of Ward Hill, Mass., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution.

The mixture of powdered oxide and the metal nanoparticle/passivating solvent mixture can be mixed to form a homogenous solution, suspension or dispersion. The homogenous solution, suspension or dispersion can be formed using sonicator, a standard laboratory stirrer, a mechanical mixer, or any other suitable method, optionally with heating. For example, the mixture of metal nanoparticles, powdered oxide, and passivating solvent can be first sonicated at roughly 80° C. for 2 hours, and then sonicated and mixed with a laboratory stirrer at 80° C. for 30 minutes to provide a homogenous solution.

After secondary dispersion, the dispersed metal nanoparticles and powdered oxide can be extracted from the passivating solvent. The extraction can be by filtration, centrifugation, removal of the solvents under reduced pressure, removal of the solvents under atmospheric pressure, and the like. For example, extraction includes heating the homogenized mixture to a temperature where the passivating solvent has a significant vapor pressure. This temperature can be maintained until the passivating solvent evaporates, leaving behind the metal nanoparticles deposited in the pores of the $Al_2O_3$. For example, if diethylene glycol mono-n-butyl ether as the passivating solvent, the homogenous dispersion can be heated to 231° C., the boiling point of the passivating solvent, under an $N_2$ flow. The temperature and $N_2$ flow are maintained until the passivating solvent is completely evaporated. After evaporating the passivating solvent, the powdered oxide and metal nanoparticles are left behind on the walls of the reaction vessel as a film or residue. When the powdered oxide is $Al_2O_3$, the film will typically be black. The metal nanoparticle and powdered oxide film can be removed from the reaction vessel and ground to create a fine powder, thereby increasing the available surface area of the mixture. The mixture can be ground with a mortar and pestle, by a commercially available mechanical grinder, or by any other methods of increasing the surface area of the mixture will be apparent to those of skill in the art.

Without being bound by any particular theory, it is believed that the powdered oxide serves two functions during the extraction process. The powdered oxides are porous and have high surface area. Therefore, the metal nanoparticles will settle in the pores of the powdered oxide during secondary dispersion. Settling in the pores of the powdered oxide physically separates the metal nanoparticles from each other, thereby preventing agglomeration of the metal nanoparticles during extraction. This effect is complemented by the amount of powdered oxide used. As noted above, the weight ratio of metal nanoparticles to powdered oxide can be between about 1:10 and 1:15. The relatively larger amount of powdered oxide in effect serves to further separate or 'dilute' the metal nanoparticles as the passivating solvent is removed. The process thus provides metal nanoparticles of defined particle size.

As will be apparent to those of skill in the art, the catalyst thus prepared can be stored for later use. In another aspect, the metal nanoparticles can be previously prepared, isolated from the passivating solvent, and purified, and then added to a powdered oxide in a suitable volume of the same or different passivating solvent. The metal nanoparticles and powdered oxide can be homogenously dispersed, extracted from the passivating solvent, and processed to increase the effective surface area as described above. Other methods for preparing the metal nanoparticle and powdered oxide mixture will be apparent to those skilled in the art.

The metal nanoparticles thus formed can be used as a growth catalyst for synthesis of carbon nanotubes, nanofibers, and other one-dimensional carbon nanostructures by a chemical vapor deposition (CVD) process.

VI. Carbon Precursors

The carbon nanotubes can be synthesized using carbon precursors, such as carbon containing gases. In general, any carbon containing gas that does not pyrolize at temperatures up to about 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton and xenon or a mixture thereof.

The specific reaction temperature used depends on the type of catalyst and the type of precursor. Energy balance equations for the respective chemical reactions can be used to analytically determine the optimum CVD reaction temperature to grow carbon nanotubes. This determines the required reaction temperature ranges. The optimum reaction temperature also depends on the flow rates of the selected precursor and the catalyst. In general, the method requires CVD reaction temperatures ranging from 500° C. to 1000° C., more preferably reaction temperatures ranging from 700° C. to 900° C.

Synthesis of Carbon Nanotubes

The metal nanoparticles supported on the oxide powder can be aerosolized and introduced into the reactor maintained at the reaction temperature. Simultaneously, the carbon precursor gas is introduced into the reactor. The flow of reactants within the reactor can be controlled such that the deposition of the carbon products on the walls of the reactor is reduced. The carbon nanotubes thus produced can be collected and separated.

The metal nanoparticles supported on the oxide powder can be aerosolized by any of the art known methods. In one method, the supported metal nanoparticles are aerosolized using an inert gas, such as helium, neon, argon, krypton, xenon, or radon. Preferably argon is used. Typically, argon, or any other gas, is forced through a particle injector, and into the reactor. The particle injector can be any vessel that is capable of containing the supported metal nanoparticles and that has a means of agitating the supported metal nanoparticles. Thus, the catalyst deposited on a powdered porous oxide substrate can be placed in a beaker that has a mechanical stirrer attached to it. The supported metal nanoparticles can be stirred or mixed in order to assist the entrainment of the catalyst in the transporter gas, such as argon.

Thus, the nanotube synthesis generally occurs as described below and illustrated in FIG. 2. An inert transporter gas 110, preferably argon gas, is passed through a particle injector 130. The particle injector 130 can be a beaker or other vessel containing the growth catalyst supported on a powdered porous oxide substrate. The powdered porous oxide substrate in the particle injector can be stirred or mixed in order to assist the entrainment of the powdered porous oxide substrate in the argon gas flow. Optionally, the inert gas can be passed through a drying system 120 to dry the gas. The argon gas, with the entrained powdered porous oxide, can then be passed through a pre-heater to raise the temperature of this gas flow to about 400° C. to about 500° C. The entrained powdered porous oxide is then delivered to the reaction chamber 200. A flow of methane 140 or another carbon source gas and hydrogen 150 is also delivered to the reaction chamber. The typical flow rates can be 500 sccm for argon, 400 sccm for methane, and 100 sccm for He. Additionally, 500 sccm of argon can be directed into the helical flow inlets to reduce deposition of carbon products on the wall of the reaction chamber. The reaction chamber can be heated to between about 800° C. and 900° C. during reaction using heaters 210. The temperature is preferably kept below the decomposition temperature of the carbon precursor gas. For example, at temperatures above 1000° C., methane is known to break down directly into soot rather than forming carbon nanostructures with the metal growth catalyst.

Carbon nanotubes and other carbon nanostructures synthesized in reaction chamber 200 then enter the filtration system 220. The filtration system can be composed of a single collection vessel or a series of collection vessels that are connected to outlet of the reaction chamber. The collection vessels sort the carbon nanotubes and other outputs by weight. On average, the heaviest reaction products will settle in the first collection vessel. The secondary and tertiary vessels will collect on average lighter products. The carbon nanotubes will be relatively light compared to many of the soot particles generated, so the carbon nanotubes will preferentially collect in the secondary and tertiary collection vessels.

The collection vessels permit continuous operation of the reaction chamber, as the chamber does not have to be cooled to harvest the synthesized nanotubes. Instead, the nanotubes can be harvested by changing the collection vessel. The collection vessels can be connected via valves. In order to permit continuous operation, each collection vessel has outlet valves to allow for connection of two additional collection vessels. During typical operation, one outlet valve on each collection vessel will be open. As the reaction products flow down from the reaction chamber, the collection vessels will capture the various reaction products, with lighter reaction products tending to accumulate in the secondary or tertiary collection vessel. To harvest reaction products from a given collection vessel, the first outlet valve is closed and the second outlet valve is opened. This diverts the flow of reaction products into a second collection vessel. The first collection vessel can then be opened for harvesting of the reaction products while still synthesizing additional carbon nanostructures.

Separation of Reaction Products

The collection vessels permit continuous operation of the reaction chamber as the chamber does not have to be cooled to harvest the synthesized nanotubes. Instead, the nanotubes can be harvested by either emptying the collection vessels or by changing the collection vessel. The collection vessels can be connected via valves. In order to permit continuous operation, each collection vessel has outlet valves to allow for connection of two additional collection vessels. During typical operation, one outlet valve on each collection vessel will be open. As the reaction products flow down from the reaction chamber, the collection vessels will capture the various reaction products, with lighter reaction products tending to accumulate in the secondary or tertiary collection vessel. To harvest reaction products from a given collection vessel, the first outlet valve is closed and the second outlet valve is opened. This diverts the flow of reaction products into a second collection vessel. The first collection vessel can then be opened for harvesting of the reaction products while still synthesizing additional carbon nanostructures.

The collection vessels are generally cyclone-type separators. Typically, in the cyclone separators, the transport gasses having the carbon nanotubes and byproducts entrailed therein generally enters a cylindrical chamber tangentially through an upper inlet. The particles in the transport gas spin in a vortex and follow a helical, downwardly inclined path. The heavier particles are forced to the outside wall by centrifugal force, while the lighter particles remain entrained in the transport gases. The centrifugal forces can be described by the following equation:

$$F_{centrifugal} = \frac{m_{part} V^2}{R}$$

where F is a centrifugal force, m is the mass of the particle, V is the velocity of the particle, and R is the radius of the spiral motion of the particle as it spins down. The heavier particles forced to the wall are then pulled by gravity down the walls and eventually fall to the bottom. The transport gases with the lighter particles still entrained can exit through a discharge outlet which extends from atop the cyclone separator.

Figure 4:
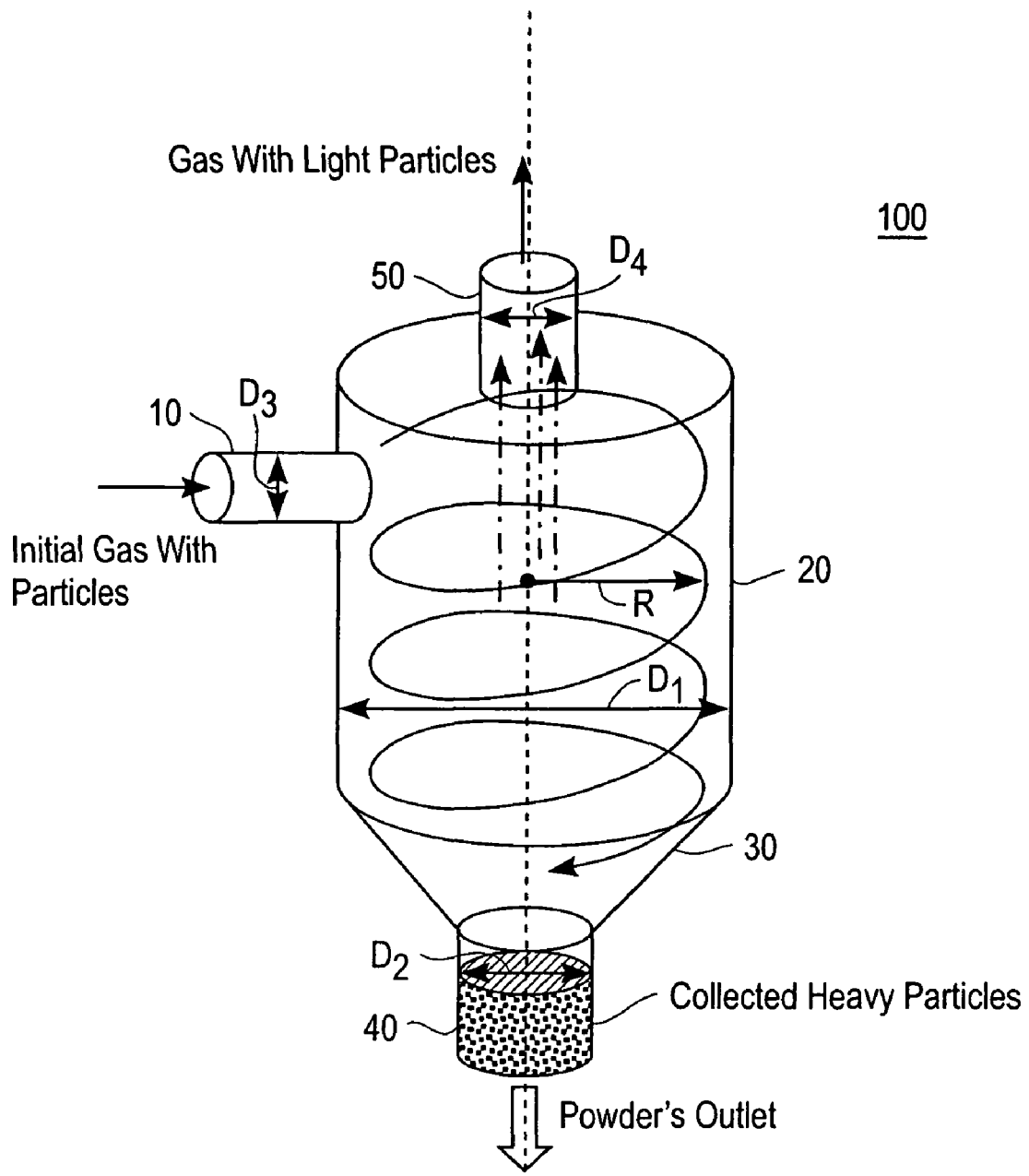
FIG. 4 illustrates the cyclone separator used to separate heavy carbonaceous particles from light particles where the carbon single-walled nanotubes are predominant.

Thus, the cyclone separators utilize centrifugal forces and low pressure caused by spinning motion to separate solid particles of differing density, size and shape. FIG. 4 illustrates the operating principles in a typical cyclone separator that can be utilized to remove entrained particles from a transport gas, such as may be used in the synthesis of carbon nanotubes. The cyclone separator 100 has an inlet pipe 10 and a main body comprising upper cylindrical portion 20 and lower conical portion 30. The particle laden gas stream is injected through inlet pipe 10 which is positioned tangentially to upper cylindrical portion 20. The shape of upper cylindrical portion 20 and the conical portion 30 induces the gas stream to spin creating a vortex. Larger or more dense particles are forced outwards to the walls of cyclone separator 100 where the drag of the spinning air as well as the force of gravity causes them to fall down the walls into an outlet or collector 40. The lighter or less dense particles, as well as the gas medium itself, reverses course at approximately collector 40 and pass outwardly through the low pressure center of separator 100 and exit separator 100 via gas outlet 50 which is positioned in the upper portion of upper cylindrical portion 10.

The efficiency of the cyclone separator in removing particles of different diameters depends on the diameter ($D_1$) of the cyclone, the diameter ($D_2$) of the powder outlet, the diameter ($D_3$) of the inlet, and the diameter ($D_4$) of the gas outlet. These dimensions can be varied to alter the diameter of the particles that may be removed by the cyclone.

Typically, there are four ways to increase the small particle removal efficiency of a cyclone. These are (1) reducing the cyclone diameter; (2) reducing the outlet diameter; (3) reducing the cone angle; and (4) increasing the body length. Further, an increase in the pressure drop can increase the particle capture efficiency as well as increase the capacity of the cyclone separator. Generally, a smaller cyclone diameter creates higher cyclone speeds and higher centrifugal forces can be achieved thereby permitting the separation of smaller particles.

As will be evident to one of skill in the art, the particles which are suspended or entrained in a transport gas are not homogeneous in their particle size distribution. The fact that particle sizes take on a spectrum of values can necessitate that a plurality of cyclonic separators be used in a series. For example, the first cyclonic separator in a series can separate out large particles. The smaller particles remain entrained in the transport gas and are transported to the second sequential cyclone. The second sequential cyclone is designed to remove the smaller particles which are entrained in the transport gas. If larger particles are carried over into the second cyclone separator, then they will typically not be removed by the cyclone separator but exit the cyclone with the transport gas stream. Accordingly, a plurality of cyclone separators that are attached to the reaction chamber in parallel or in a series can be used to separate carbon nanotubes from the byproducts of the reaction that are entrained in a transport gas stream.

The carbon nanotubes and nanostructures produced by the methods and processes described above can be used in applications that include Field Emission Devices, Memory devices (high-density memory arrays, memory logic switching arrays), Nano-MEMs, AFM imaging probes, distributed diagnostics sensors, and strain sensors. Other key applications include: thermal control materials, super strength and light weight reinforcement and nanocomposites, EMI shielding materials, catalytic support, gas storage materials, high surface area electrodes, and light weight conductor cable and wires, and the like.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Catalysts were prepared by impregnating support materials in metal salt solutions. For the single metallic iron based catalyst, $FeAc_2$ in methanol was used at a molar ratio of $Fe:Al_2O_3$ of 1:15. Under a nitrogen atmosphere, $FeAc_2$ was added to dietheylene glycol mono-n-butyl ether in the molar ratio of 1 mM:20 mM. The reaction mixture was mixed under the nitrogen atmosphere using a magnetic stir bar, and heated under reflux for 90 minutes. The reaction mixture was then cooled to room temperature, and $Al_2O_3$ (15 mM) was added at once. The reaction solution was stirred at room temperature for 15 minutes, and then heated to 150° C. for 3 hours. The reaction was cooled to 90° C. while flowing a stream of $N_2$ over the mixture to remove the solvent. A black film formed on the walls of the reaction flask. The black film was collected and ground with an agate mortar to obtain a fine black powder.

Example 2

Synthesis of Carbon Nanotubes

Figure 2:
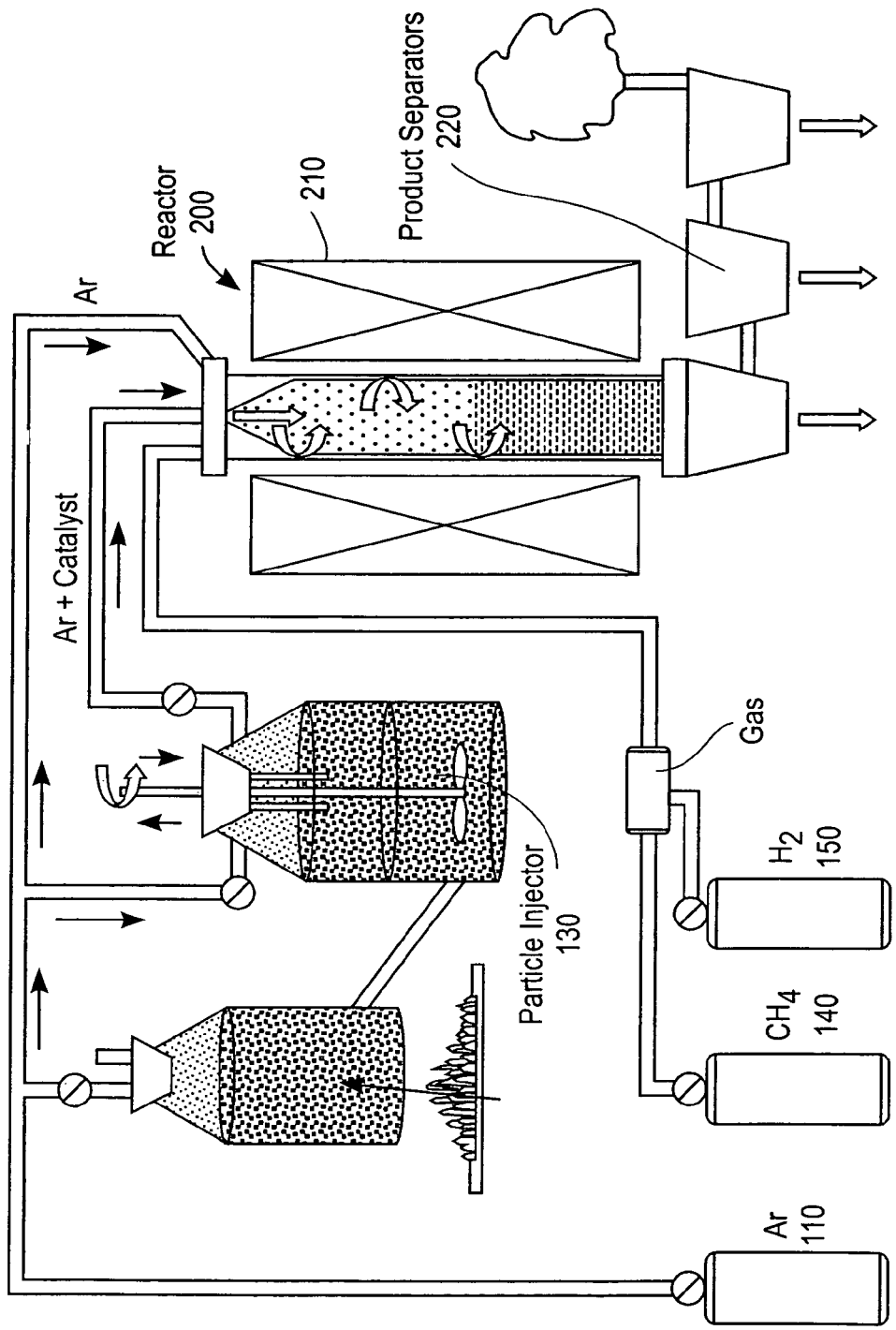
FIG. 2 depicts an apparatus for the large scale production of one-dimensional carbon nanostructures of the present invention.

Carbon nanotubes were synthesized by using the experimental setup shown in FIG. 2. Typically, 10 g of the $Al_2O_3$-supported iron catalyst was placed in the particle injector mounted with a mechanical stirrer. The catalyst was stirred while argon is passed through the particle injector at a flow rate of 500 sccm. The argon flow with the entrained particles is passed through a flexible tube that is wrapped around a central heating coil that serves as the pre-heater. The pre-heater was set for 600° C. The pre-heated argon flow with the entrained particles was then passed into the reaction chamber.

Figure 3:
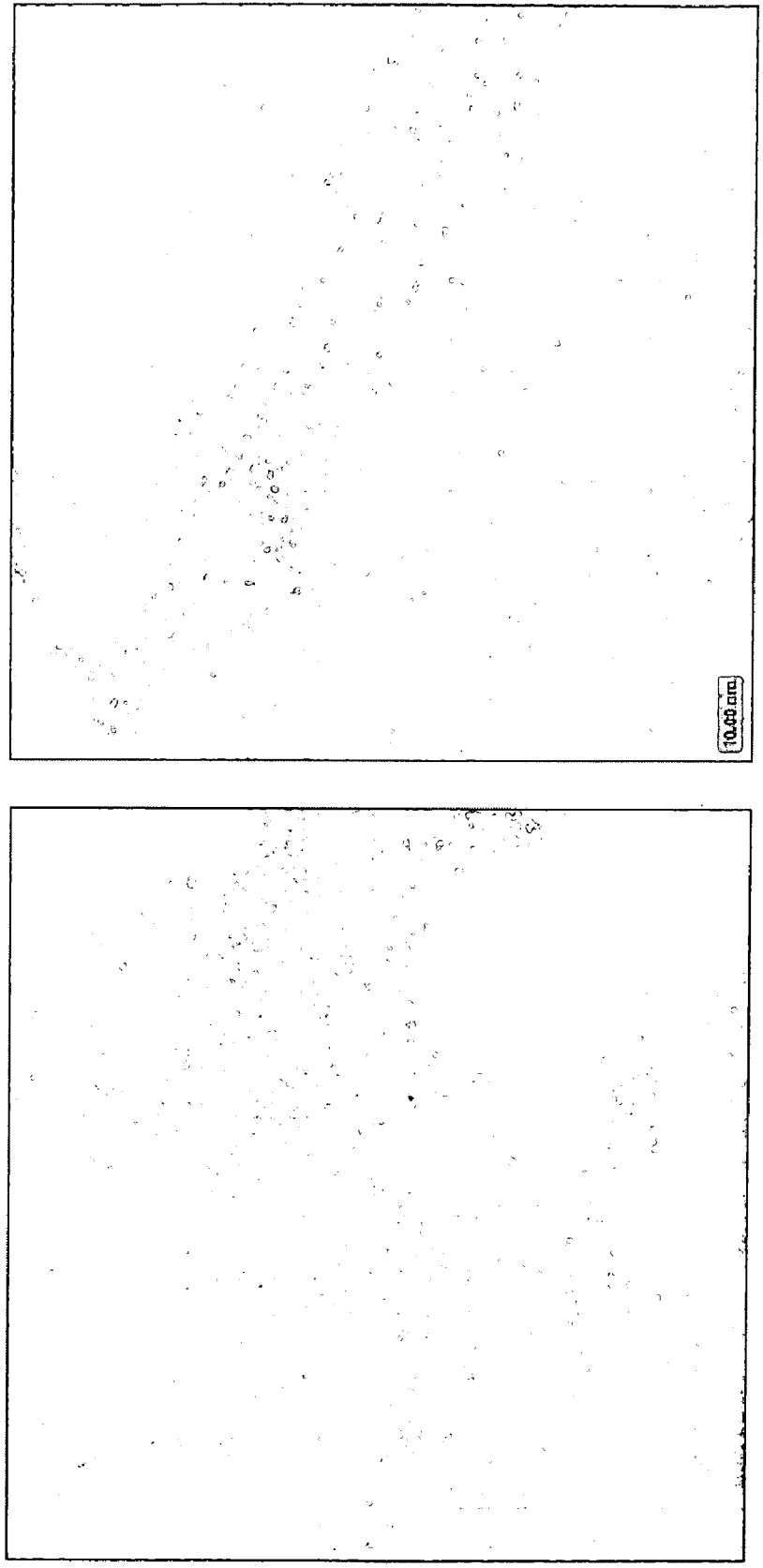
FIG. 3 depicts images of the carbon single-walled nanotubes grown by the methods of the present invention.

The reaction chamber was heated to 900° C. Argon, at a rate of 500 sccm, was injected through the helical flow inlets into the reaction chamber. Argon as a transport gas for catalysts, at the rate of 1500 sccm, was injected through the injector to the chamber. The synthesis was begun by flowing a mixture at $CH_4$ at a flow rate of 150 sccm and $H_2$ at a flow rate of 50 sccm into the reaction chamber. The temperature and gas flows were maintained for 120 minutes in order to form carbon nanostructures. The single-walled carbon nanotubes were collected using the product separators. Carbon nanotubes were made at a yield of ~100 g/h. The TEM images of the single-walled carbon nanotubes thus produced is given in FIG. 3.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

I claim:

1. A method for synthesizing carbon nanostructures, the method comprising:
   providing a catalyst of metal nanoparticles, wherein the catalyst is supported on a powdered oxide substrate having a particle size of 0.5 μm to 5 μm;
   entraining the catalyst in an inert gas; and
   exposing the entrained catalyst to a carbon precursor gas at a temperature sufficient to form carbon nanostructures, wherein the carbon nanostructure is single-walled carbon nanotubes.

2. The method of claim 1, wherein the catalyst is a metal selected from the group consisting of iron, nickel, molybdenum and cobalt, or mixtures thereof.

3. The method of claim 2, wherein the metal is iron.

4. The method of claim 2, wherein the metal is molybdenum.

5. The method of claim 1, wherein the catalyst has a particle size between 3 nm to 7 nm or about 5 nm to 10 nm.

6. The method of claim 1, wherein the powdered oxide substrate is selected from the group consisting of $Al_2O_3$, $SiO_2$, MgO and zeolites.

7. The method of claim 6, wherein the powdered oxide substrate is $Al_2O_3$.

8. The method of claim 1, wherein the inert gas is selected from the group consisting of argon, helium, nitrogen, or hydrogen.

9. The method of claim 8, wherein the inert gas is argon.

10. The method of claim 1, wherein the carbon precursor gas is selected from the group consisting of methane, ethane, propane, ethylene, propylene, and carbon dioxide.

11. The method of claim 10, wherein the carbon precursor gas is methane.

12. The method of claim 1, further comprising another gas.

13. The method of claim 12, wherein the other gas is selected from the group consisting of hydrogen, helium, argon, neon, krypton and xenon or a mixture thereof.

14. The method of claim 13, wherein the other gas is a mixture of hydrogen and argon.

15. The method of claim 1, wherein the temperature is less than 1000° C.

16. The method of claim 15, wherein the temperature is about 800° C. to 1000° C.

17. A carbon nanotube structure produced by the process of:
    entraining a catalyst in an inert gas, wherein the catalyst is a metal supported on a powdered oxide substrate, wherein the metal is selected from the group consisting of iron, nickel, molybdenum and cobalt, or mixtures thereof, and the powdered oxide substrate selected from the group consisting of $Al_2O_3$, $SiO_2$, MgO and zeolites;
    exposing the entrained catalyst to a precursor gas at a temperature sufficient to form carbon nanotube structure; and
    collecting the synthesized carbon nanostructures, wherein the carbon nanostructure is single-walled carbon nanotubes.

18. The process of claim 17, wherein the metal is iron.

19. The process of claim 17, wherein the metal is molybdenum.

20. The process of claim 17, wherein the powdered oxide substrate is $Al_2O_3$.

21. The process of claim 17, wherein the powdered oxide substrate has a particle size of 0.5 μm to 5 μm, and the metal has a particle size between 3 nm to 10 nm.

22. The process of claim 17, wherein the inert gas is selected from the group consisting of argon, helium, nitrogen, or hydrogen.

23. The process of claim 22, wherein the inert gas is argon.

24. The process of claim 17, wherein the reactant gas is selected from the group consisting of methane, ethane, propane, ethylene, propylene, and carbon dioxide.

25. The process of claim 24, wherein the reactant gas is methane.

26. The process of claim 24, further comprising another gas selected from the group consisting of hydrogen, helium, argon, neon, krypton and xenon or a mixture thereof.

27. The process of claim 26, wherein the other gas is a mixture of hydrogen and argon.

28. The process of claim 17, wherein the temperature is less than 1000° C.

* * * * *